Dec. 3, 1957  J. A. CRAIN  2,814,974
ADJUSTABLE WORK SUPPORTS FOR MILLING MACHINES
Filed March 21, 1956  2 Sheets-Sheet 1

INVENTOR.
JAMES A. CRAIN
BY
J. Ledermann
ATTORNEY

Dec. 3, 1957   J. A. CRAIN   2,814,974
ADJUSTABLE WORK SUPPORTS FOR MILLING MACHINES
Filed March 21, 1956   2 Sheets-Sheet 2
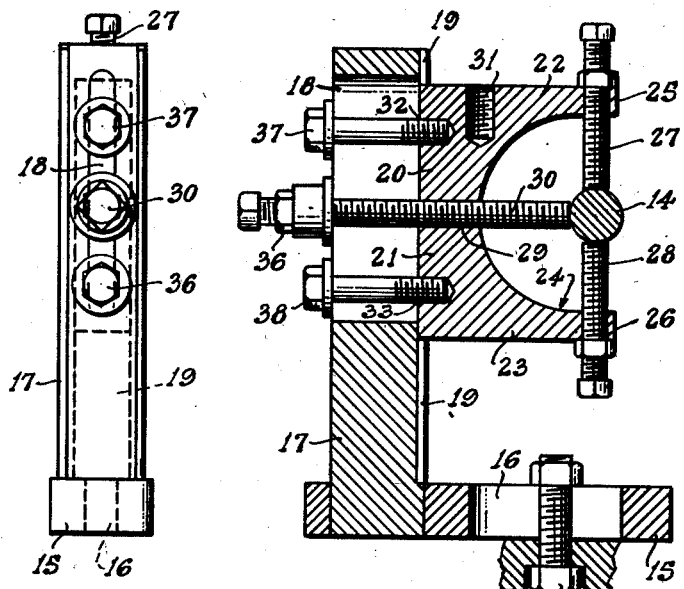
Fig. 4
Fig. 5
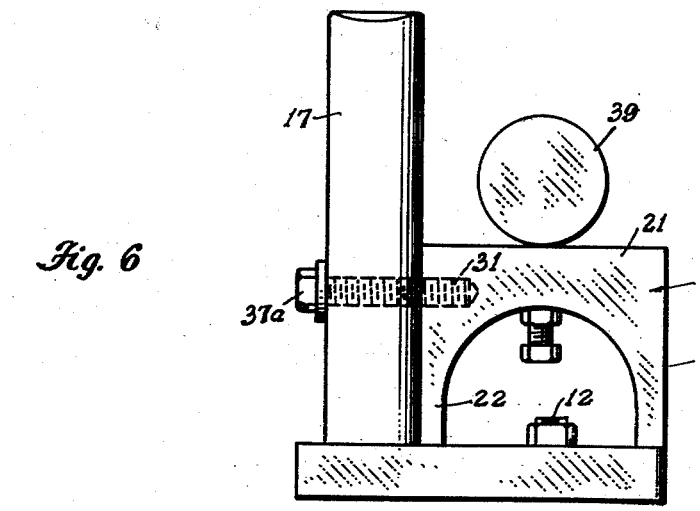
Fig. 6
INVENTOR.
JAMES A. CRAIN
BY
J. Ledermann
ATTORNEY

2,814,974
ADJUSTABLE WORK SUPPORTS FOR MILLING MACHINES

James A. Crain, Hackensack, N. J.

Application March 21, 1956, Serial No. 573,004

6 Claims. (Cl. 90—59)

This invention relates to milling machines, and more particularly to work supports therefor.

In milling keyways, flats etc. with end mills, owing to their short lengths it is necessary for the work piece to extend a considerable distance over the milling vise to clear the same, thereby making it necessary to support the work from three directions, to wit, up, down, and horizontally. The usual method of meeting this situation has been to select a machinist's jack, an angle plate, several thicknesses and lengths of flat stock plus different lengths of T bolts, then to proceed to build up support from the desired directions. If more than one piece was to be milled, the build-up had to be repeated after each piece was finished, as the build-up collapsed after the work was removed.

It is the main object of the present invention to provide a work support to overcome the above difficulties and disadvantages of the old method above described, which can be set up in a few seconds thereby eliminating practically all set-up time. The instant support is versatile; it may take work pieces ranging, for example, between one-half inch and three inches in diameter, and it may be changed to accommodate different types of work pieces.

The above broad as well as additional and more specific objects will be clarified in the following description wherein reference numerals refer to like-numbered parts in the accompanying drawing. It is to be understood that the drawing is intended solely for the purpose of illustration and that it is therefore neither desired nor intended to limit the invention necessarily to any or all of the exact details of construction shown or described except insofar as they may be deemed essential to the invention.

Referring briefly to the drawing,

Fig. 4 is a sectional view taken on the line 4—4 of Fig. 1, with parts of the machine table omitted.

Fig. 5 is a front elevational view of the work support per se, that is, looking at it from the left, Fig. 2.

Fig. 6 is a side elevational view of the work support showing its detachable part in yet another position, for supporting a work piece only from below.

Figure 1:
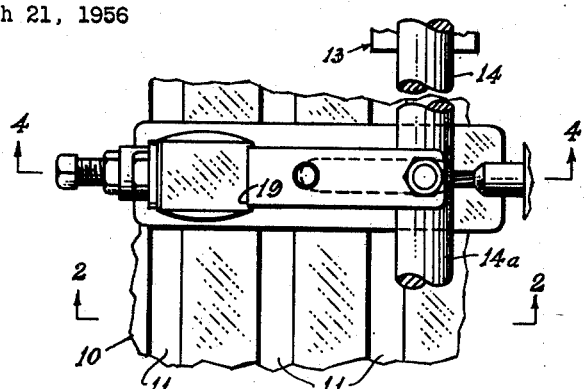
Fig. 1 is a fragmentary plan view, looking down upon the table of a milling machine, with parts broken away and partly in section, illustrating the work support of the present invention in position for one of its possible uses in supporting one end of a work piece being worked upon.
Figure 2:
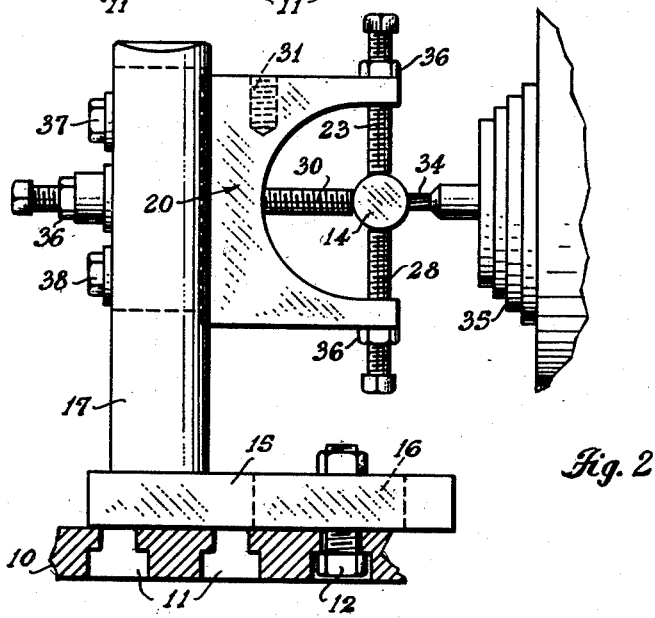
Fig. 2 is a sectional view taken on the line 2—2 of Fig. 1, showing the work support in side elevation.

Referring in detail to the drawing, the numeral 10 indicates the table of a milling machine, provided with the usual parallel T-shaped slots 11 adapted to receive T-bolts 12 to lock a member to the table at any position along the slots, and the numeral 13 indicates, merely for the purpose of illustration, the vise of the machine. Supported in the vise, merely by way of example, a shaft 14 is shown. In order for the machine to be able to operate on the shaft, as stated above, it is necessary to provide support for the free end 14a of the shaft.

The work support of the present invention is described as follows. The device comprises a relatively elongated base 15 adapted to be positioned on the machine table 10 at right angles to the T-slots 11, and the base is provided with a longitudinal slot 16. With a T-bolt 12 passed through the table slot 11 and the base slot 16, it is obvious that the base is positionable with respect to the table at any point throughout the length of the slots 11, and also at any position transversely of the table. In other words, the base 15 may be locked at any position transversely or longitudinally of the table.

A column 17, made rigid with the base 15 in any desired manner, rises from the base at that end thereof opposite to the base slot 16. The column has a slot 18 extending through approximately one-half the height thereof in the upper portion thereof and lying substantially in a vertical plane through the base slot 16. Throughout substantially the length of the column, a rectangular groove 19 is cut into that side of the column facing toward the right, Figs. 1 and 4; the width of this groove is larger than the width of the slot 18 and the opposed side walls of the groove are equally spaced from the adjacent side walls of the slot 18. A block 20 having substantially the same thickness as the width of the groove 19 comprises a base 21 and two side arms 22 and 23 at right angles to the base 21, the block having the general appearance of a yoke, with a cut-out 24, preferably rounded, between the arms and the base of the block. Aligned openings 25 and 26 are provided through the ends of the arms 22 and 23, respectively, receptive of work supporting set screws 27 and 28, respectively. A threaded opening 29 extends through the midpoint of the base 21 and receives a work-holding or set screw 30. The arm 22 also has a threaded socket 31 extending thereinto at, substantially, its junction with the base 21. Additional threaded sockets 32 and 33 extend into the base 21, parallel with the opening 29.

Assuming that the shaft 14 is to have its end 14a supported in position to be worked upon by the tool 34 actuated by the rotating head 35 of the milling machine, it should now be apparent that the end 14a is readily and firmly supported and held by the screws 27, 28 and 30, the screws also serving to position the shaft end in exact alignment with the end of the shaft held in the vise 13. Appropriate locking nuts 36 serve to hold these screws fast.

In the operation of properly positioning the block 20 for the above purpose, it is apparent that upon loosening the nut 36 on the screw 30, the block is free to be slid upward or downward along the groove 19, as the screw 30 passes through the column slot 18. Additionally for holding the block securely in the groove, two screw bolts are provided at 37 and 38, extending through the slot 18 and registering, respectively, in the sockets 32 and 33. These screw bolts are also loosened in order to permit sliding the block upward or downward.

Figure 3:
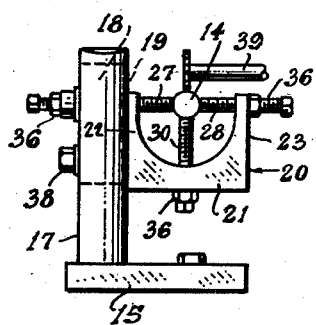
Fig. 3 is a similar side elevational view of the work support with its detachable part supported in a position at ninety degrees to the position thereof shown in Fig. 2, for the purpose of having a different operation performed on the work piece.

Fig. 3 shows the position of the block 20 altered in that the arm 22 now registers in the groove 19, and the work piece 14 is positioned to be approachable from above, as by a tool 39, to cut, for instance, a keyway into the shaft.

When a work piece is to be supported only from underneath, the block 20 is positioned as shown in Fig. 6, with the base 21 at the top and with a single screw bolt 37a registering in the socket 31 of the arm 22, to hold the block securely against the column. The work piece 39 is here shown circular in cross-section, as before, merely by way of example.

It is apparent that a simple, accurate, efficient and time-saving work support has thus been provided, which is at the same time inexpensive in cost of manufacture and entails a minimum of parts.

I claim:

1. A device for supporting a work piece adapted to be worked upon by a machine tool, comprising a base having a column extending therefrom, said column having a slot therethrough substantially in a vertical plane through said base slot and having a rectangular groove in one side thereof in the same plane as the column slot and at least as long as the column slot, the width of said groove exceeding the width of the column slot, said groove having its side walls spaced outward from the side walls of the column slot, a block having substantially the thickness of said groove and including a flat base having two arms extending therefrom, the outer surfaces of said arms being flat and at right angles to the block base, said arms having aligned threaded openings in the ends thereof, said block base having a threaded opening therethrough intermediate its length and in the same plane as said first-named openings, either of said arms or said block base being selectively slidable in said groove, set screws mounted in said threaded openings, said block being mounted on said column with either of said arms or said block base registering in said groove with the appropriate one of said set screws extending through said column slot, said set screws being adjustable to support the work piece between the tips thereof, and means for locking at least said appropriate one of said set screws against loosening.

2. The device set forth in claim 1, one of said arms having a threaded socket extending thereinto through the flat surface thereof and lying in the same plane as said threaded openings in the ends of the arms and in the block base, said block when said one of said arms registers in said groove having a locking bolt threadably engaging said socket and passing through said column slot.

3. The device set forth in claim 1, said block base having additional threaded sockets extending thereinto in the plane of said openings in the block arms and positioned on opposite sides of said threaded opening in the block base, additional locking bolts registering in said additional sockets and extending through said column slot when said block is positioned with the block base registering in said groove.

4. A device for supporting a work piece adapted to be worked upon by a machine tool, comprising a base having a column extending therefrom near one end of the base, said column having a slot therethrough substantially in a vertical plane through the base, said column having a vertical groove in that side thereof facing the other end of the base, said groove lying substantially in said plane and having a greater width than said slot, the side walls of said groove being spaced outward from the side walls of the slot, a substantially rectangular block having a flat base and having the two sides thereof adjacent the block base flat and at right angles to the block base, said block having a cut-out therethrough extending from a position near the block base through that side of the block opposite the base thereby forming said adjacent sides into arms, said arms having aligned threaded openings therethrough, said block base having a threaded opening therethrough intermediate its length lying in a common plane with said arm openings, said block being slidable in said groove with either of said arms or said base thereof selectively registering in the groove, set screws registering in said arm openings, a set screw registering in said base opening, said set screws being adjustable to bring the tips thereof into contact with the work piece to support and hold the same, that one of said set screws registering in the block base extending through the column slot or through one of said arms depending upon whether the block base or either of said arms is slidably mounted in said groove, and means for locking in said slot said last-named one of said set screws.

5. A device for supporting and positioning a work piece adapted to be worked upon by a tool comprising a base having a column thereof, a block slidably and detachably mounted on one side of the column, said block having opposed arms forming two sides of the block and having a base joining said sides, adjustable means extending through the arms and through the block base for engaging the work piece to support and hold the same, and means for locking the block to the column.

6. The device set forth in claim 5, the outer surfaces of said block base and said arms being flat, said surfaces of said arms being at right angles to said surface of said block base, said column having a vertical groove therein, said block being slidable in said groove with, selectively, either of said arms or said block base registering in said groove.

References Cited in the file of this patent

UNITED STATES PATENTS

| | | |
|---|---|---|
| Re. 14,299 | Peterson | May 8, 1917 |
| 602,965 | Walker | Apr. 26, 1898 |
| 2,118,260 | Marsilius | May 24, 1938 |
| 2,625,861 | Swanson | Jan. 20, 1953 |